Figure 1:
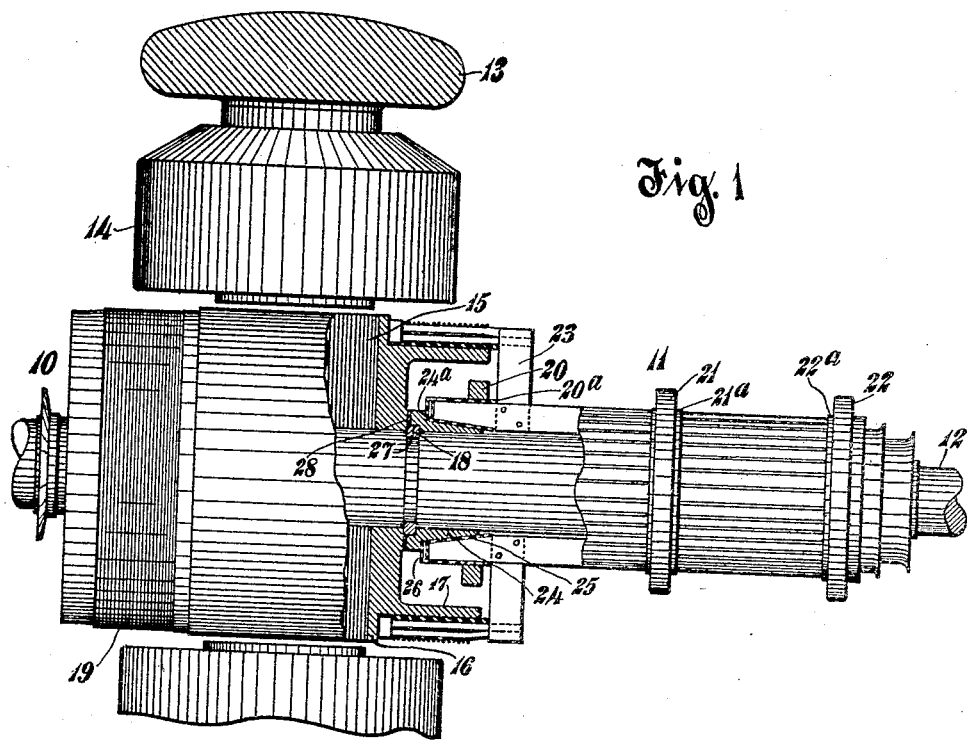

A. H. WOUTERS.
DIRECT CURRENT TURBO GENERATOR.
APPLICATION FILED NOV. 3, 1906.

932,661.

Patented Aug. 31, 1909.

Witnesses

Inventor
Alfred H. Wouters
By
Chas. E. Lord
Attorney

UNITED STATES PATENT OFFICE.

ALFRED H. WOUTERS, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DIRECT-CURRENT TURBO-GENERATOR.

932,661.   Specification of Letters Patent.   Patented Aug. 31, 1909.

Application filed November 3, 1906. Serial No. 341,816.

*To all whom it may concern:*

Be it known that I, ALFRED H. WOUTERS, belonging to the Kingdom of the Netherlands, residing at Norwood, in the county of Hamilton and State of Ohio, have invented certain new and useful Improvements in Direct-Current Turbo-Generators, of which the following is a full, clear, and exact specification.

My invention relates to direct-current dynamo-electric machines, particularly to high speed machines such as turbo-generators.

In high speed direct-current machines, the number of poles and consequently the number of brush-studs is comparatively small, with the result that long commutators are required to obtain the necessary brush contact surface. The commutator bars in high speed machines are usually held in position by a plurality of clamping rings, spaced about equally over the commutator length. The space occupied by these rings is considerable, and therefore cause the commutator and hence the entire machine to be materially lengthened.

The commutator leads or necks have heretofore been connected to the ends of the bars, and the rings have heretofore all been located at one side of the commutator leads, the latter being between the armature core and the first ring adjacent thereto.

In assembling the commutator, the commutator leads or necks are first secured to the bars, preferably by riveting and the bars are then temporarily secured together by clamping means. The insulation for separating the bars from the clamping rings is then placed on the bars and carefully baked. The rings are then placed into position one at a time, from the end of the commutator opposite the leads or necks. It is rather a difficult matter to place the first rings in position by moving them lengthwise of the bars from the end opposite the commutator leads, without injuring the insulation which is to separate the other rings from the bars.

The laminæ of the core are usually clamped between end-members, of which the one adjacent the commutator is usually held in position by a shoulder on the shaft, the other being held in position by a split clamping ring, nut, or other device. The ends of the commutator bars adjacent the armature core are usually supported on an inclined and insulated portion of the shaft, the shoulder above referred to and the inclined portion of the shaft forming a part of an enlargement of the shaft, or the commutator bars are supported on a conical sleeve, the sleeve abutting against a second shoulder on the shaft. The shoulder and inclined portion of the shaft, or the two shoulders, as the case may be, necessitate a much larger forging for the shaft than would otherwise be required if the shoulder and inclined portion, or shoulders could be dispensed with, and necessitate considerable machining, increasing materially the cost of the machine.

One of the objects of my invention is to provide a more compact machine by decreasing its length and hence the floor space heretofore required.

A further object is to provide a commutator of such a construction that the rings which surround the bars can more easily be placed in position and without so much danger of injuring the insulation.

A still further object is to provide means whereby a cheaper shaft can be employed.

In carrying out the first and second objects of my invention above enumerated, instead of connecting the commutator leads or necks to the ends of the bars and placing the rings all at one side of these leads, I connect the leads or necks to the bars a short distance from their ends, so as to leave sufficient space between the ends of the bars and the leads for one of the clamping rings. With this construction the ring adjacent the commutator leads can be slipped into position from one end of the commutator and the other rings from the other end of the commutator. Furthermore with this construction, a portion of the commutator bars and the ring adjacent the commutator leads are located within the annular shoulder of the bracket which supports the ends of the armature coils. This space within the annular shoulder, in machines as heretofore constructed, is unoccupied and therefore is a dead waste.

In carrying out the third object of my invention, I provide a support for the ends of the commutator bars, and provide for this support and the adjacent end-clamping member for the armature a single abutment consisting preferably of a split ring located in a groove in the shaft between said support and end-member.

My invention still further consists in novel details of construction and combinations and arrangements of parts described in the specification and set forth in the appended claims.

For a better understanding of my invention, reference is had to the accompanying drawings forming a part of this application in which—

Figure 2:
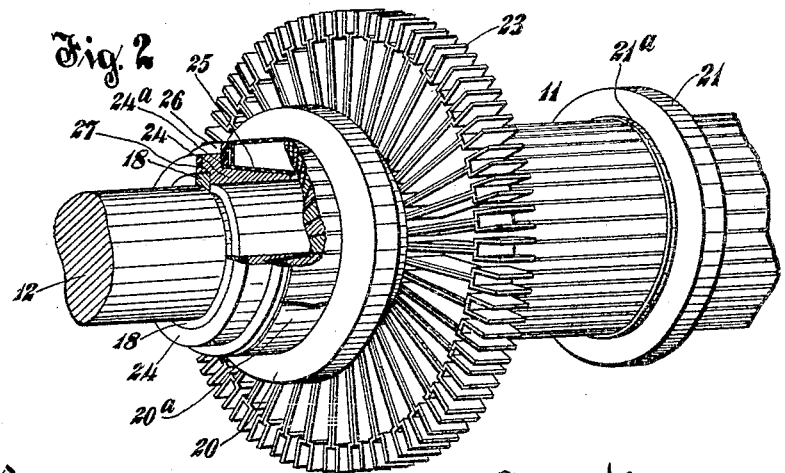

Figure 1 is a partial longitudinal sectional elevation of a machine equipped with my invention; and Fig. 2 is an isometric projection of a portion of the commutator including the commutator necks or leads, parts being broken away.

Referring now to the figures of the drawing, I have shown at 10 an armature of a high speed direct current machine and at 11 a commutator, both being mounted on the shaft 12. The armature is adapted to rotate within a field member consisting of a yoke 13 and field magnets 14. The armature consists of laminæ 15 clamped between end-members one of which is shown at 16, which end-member 16 is provided with an annular shoulder or bracket 17 for supporting the ends of the coils. The end-member abuts against and is retained in position, in this case, by a split clamping ring 18 which is located in a groove in the shaft and extends outward beyond the surface of the shaft. This ring may consist of one or several parts. The core is slotted and provided with a winding consisting of coils which project beyond each end of the core, the projecting portions resting on the annular shoulders or brackets of the end-members being held thereto by band-wire 19. The commutator 11 consists of long bars surrounded by clamping rings 20, 21 and 22 which are separated from the bars by insulation $20^a$, $21^a$ and $22^a$ respectively. The rings are preferably shrunk over the bars, although they may be pressed on or brought into position in any other desired manner.

The commutator bars are connected to the coils by radial commutator leads or necks 23, the leads being preferably riveted and soldered to the bars and soldered to the coils. It will be seen that the commutator leads are connected to the bars, not at the ends thereof as in commutators heretofore constructed for machines of this type, but at a short distance from the ends, the ends at the left of the leads 23 being located within the annular shoulder or bracket 17 of the end-member 16 and extending inwardly to a point adjacent the end-member. By connecting the commutator leads to the bars as shown, I am able to place the ring 20 on the commutator at the left of the commutator leads or between the leads and the armature core, and therefore also within the overhanging annular shoulder or bracket 17. In this case the ends of the bars are supported on a conical sleeve 24, being separated therefrom by insulation 25 and from a shoulder $24^a$ of the sleeve by a fiber ring 26. It is seen that the insulation $20^a$ extends from the fiber ring 26 to the commutator leads. The sleeve 24 is provided with a shoulder 27 and with a portion which overhangs the split ring. Thus the split ring 18 serves as an abutment for the supporting sleeve 24 as well as for the end-clamping member 16. It is also seen that the overhanging portion of the sleeve 24 prevents displacement of the split ring. The shoulder 27 of the supporting sleeve 24 is in this case separated from the end-member 16 by a ring or washer 28. This ring 28 serves merely as a cushion between the armature and commutator. It may be omitted, and if desired a small clearance left between the end member 16 and sleeve 24. It is seen that with this construction the machine is considerably shortened, since a portion of the commutator including the ends of the bars and the ring 18 are located within the heretofore unoccupied space within the overhanging shoulder or bracket 17.

The ring 20 can be placed on the commutator from the end at the left of the leads or necks 23, thus avoiding the danger of injuring the insulation $21^a$ and $22^a$. If desired, to avoid danger of injury to the insulation $22^a$ when ring 21 is placed into position, the outer end of the commutator covered by the insulation $22^a$ may be slightly less in diameter than the main portion of the commutator. I have in this case shown only three clamping rings but more than three may be employed if necessary. Furthermore, since the ends of the commutator bars are adjacent the end-member 16, a single abutment, in this case the clamping ring 18, can be employed both for the end-member 16 and for the sleeve 24 which supports the ends of the bars, avoiding the use of shoulders or other enlargements of the shaft and permitting the use of a shaft of uniform diameter from the outer end of the armature to the outer end of the commutator, thereby materially decreasing the cost of the shaft. However, I do not wish to be confined to the use of a supporting sleeve 24 and a split clamping ring as an abutment. If desired, any other form of abutment or abutments for the end-member and support for the ends of the bars may be employed without interfering with the other features of my invention.

I do not wish to be confined to the exact details shown but aim in my claims to cover all such obvious modifications and changes which do not involve a departure from the spirit and scope of my invention as set forth in the appended claims.

What I claim as new and desire to secure by Letters Patent is:—

1. In an armature of a dynamo-electric machine, a shaft, a laminated core, an end-member therefor, a commutator, a sleeve supporting the ends of the commutator bars, said shaft having a groove between said end-member and sleeve, and a ring located in said groove and extending above the surface of the shaft, said ring forming an abutment for said end-member and sleeve.

2. In a dynamo-electric machine, a shaft having a groove, a split clamping ring located in said groove and extending beyond the surface of said shaft, a laminated core, an end-clamping member therefor, a commutator, and a sleeve supporting the ends of the commutator bars, said end-members and sleeve being on opposite sides of and bearing against said clamping-ring, said sleeve having a portion extending over the ring to prevent its displacement.

3. A commutator of a dynamo-electric machine, comprising a plurality of radial bars insulated from each other and having straight outer edges throughout their length, commutator leads connected to said bars intermediate their ends, and a plurality of shrink-rings surrounding said bars but insulated therefrom, one of said shrink-rings being located adjacent to said commutator leads at one side thereof, and another of said shrink-rings being located on the other side of said leads.

4. In a dynamo-electric machine, an armature comprising a core, coils, and an end-clamping member for said core, said end-member having an outwardly extending shoulder or bracket supporting the ends of the coils, a commutator, commutator leads or necks connecting the coils and commutator bars, said bars extending under said shoulder or bracket, and a clamping-ring surrounding the ends of the commutator bars and being independent of the internal support for said commutator and located between said leads or necks and the core.

5. In a dynamo-electric machine, an armature comprising a core, coils, and an end-clamping member for said core, said end-member having an outwardly extending annular shoulder or bracket supporting the ends of the coils, a commutator, commutator leads or necks connecting the coils and commutator bars, the ends of said bars being within said annular shoulder adjacent said end-member, and a member acting as a common abutment for said end-member and commutator bars.

6. In a dynamo-electric machine, an armature comprising a core, coils, and an end-clamping member for said core, said end-member having an outwardly extending annular shoulder or bracket supporting the ends of the coils, a commutator, commutator leads or necks connecting the coils and commutator bars, a shrink-ring surrounding the commutator at the end adjacent the armature, said shrink-ring being between the armature and commutator necks within the annular shoulder or bracket on said end-member.

7. In a dynamo-electric machine, an armature comprising a laminated core, coils, and an end-clamping member for the laminæ, said end-member having an annular shoulder or bracket supporting the ends of the coils, a commutator comprising bars partially within said annular shoulder or bracket, a supporting sleeve for the ends of the bars, said sleeve being adjacent the end-member, and a single abutment for the sleeve and end-member.

In testimony whereof I affix my signature, in the presence of two witnesses.

ALFRED H. WOUTERS.

Witnesses:
ARTHUR F. KWIS,
GEO. B. SCHLEY.